US012228485B2

(12) United States Patent
Han et al.

(10) Patent No.: US 12,228,485 B2
(45) Date of Patent: Feb. 18, 2025

(54) APPARATUS FOR DILUTING EXHAUST GAS

(71) Applicant: KOREA INSTITUTE OF MACHINERY & MATERIALS, Daejeon (KR)

(72) Inventors: Bangwoo Han, Daejeon (KR); Gunhee Lee, Daejeon (KR); Inyong Park, Daejeon (KR); Sang Bok Kim, Daejeon (KR); Keejung Hong, Daejeon (KR); Hak Joon Kim, Daejeon (KR); Yeawan Lee, Daejeon (KR); Yong-Jin Kim, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 161 days.

(21) Appl. No.: 17/868,878

(22) Filed: Jul. 20, 2022

(65) Prior Publication Data

US 2023/0043215 A1     Feb. 9, 2023

(30) Foreign Application Priority Data

Jul. 20, 2021  (KR) .......................... 10-2021-0094806

(51) Int. Cl.
  *G01N 1/38*  (2006.01)
  *G01N 1/22*  (2006.01)
(52) U.S. Cl.
  CPC ............. *G01N 1/38* (2013.01); *G01N 1/2258* (2013.01); *G01N 2001/386* (2013.01)

(58) Field of Classification Search
  CPC ...... G01N 1/38; G01N 1/2258; G01N 1/2247; G01N 2001/2264; G01N 2001/2261; G01N 2001/386; G01N 33/0018
  See application file for complete search history.

(56) References Cited

U.S. PATENT DOCUMENTS

| 4,150,646 A | * | 4/1979 | Aoyama | F02M 26/56 |
| | | | | 123/676 |
| 2001/0013245 A1 | * | 8/2001 | Hanashiro | G01N 33/0016 |
| | | | | 73/23.31 |
| 2001/0017031 A1 | * | 8/2001 | Sekiya | G01N 1/2252 |
| | | | | 60/272 |

(Continued)

FOREIGN PATENT DOCUMENTS

| CN | 2674428 Y | 1/2005 |
| JP | 09-325102 | * 12/1997 |

(Continued)

OTHER PUBLICATIONS

Translation of JP09325102.*

(Continued)

*Primary Examiner* — Helen C Kwok
(74) *Attorney, Agent, or Firm* — Hauptman Ham, LLP (57) ABSTRACT

The apparatus for diluting exhaust gas according to an exemplary embodiment of the present invention includes a stagnant air forming unit configured to form stagnant air by decelerating a flow velocity of introduced exhaust gas, an ejector unit connected to a front end of the stagnant air forming unit and configured to discharge the exhaust gas to a front, and a dilution unit coupled to a front end of the ejector unit.

8 Claims, 8 Drawing Sheets

(56) References Cited

U.S. PATENT DOCUMENTS

| | | | |
|---|---|---|---|
| 2003/0213311 A1* | 11/2003 | Graze, Jr. | G01N 1/2252 73/864.21 |
| 2010/0037770 A1 | 2/2010 | Baldwin et al. | |
| 2012/0017666 A1* | 1/2012 | Otsuki | G01M 15/102 73/23.33 |
| 2014/0036617 A1* | 2/2014 | Kumagai | G01N 1/2252 366/177.1 |
| 2014/0290336 A1* | 10/2014 | Miyai | G01N 1/2252 73/29.01 |
| 2015/0107330 A1* | 4/2015 | Yokoyama | G01M 15/102 73/23.31 |
| 2015/0139823 A1* | 5/2015 | Mornan | F04F 5/46 417/198 |
| 2015/0153255 A1* | 6/2015 | Asami | G01M 15/102 73/23.31 |
| 2016/0115850 A1* | 4/2016 | Otsuki | F04B 45/04 73/114.71 |
| 2016/0273438 A1* | 9/2016 | Otsuki | F01N 11/007 |
| 2016/0312682 A1* | 10/2016 | Otsuki | F01N 13/08 |
| 2016/0319726 A1* | 11/2016 | Otsuki | G01N 1/2252 |
| 2019/0022651 A1 | 1/2019 | Henning et al. | |
| 2021/0278325 A1* | 9/2021 | Han | G01N 1/2247 |

FOREIGN PATENT DOCUMENTS

| | | | |
|---|---|---|---|
| JP | 5174041 B2 | 4/2013 | |
| JP | 5249051 B2 | 7/2013 | |
| KR | 10-2013-0059592 A | 6/2013 | |
| KR | 10-2016-0116673 A | 10/2016 | |
| KR | 10-2017-0057201 A | 5/2017 | |
| KR | 10-1793982 B1 | 11/2017 | |
| KR | 10-2146277 B1 | 8/2020 | |
| KR | 10-2021-0010766 A | 1/2021 | |
| WO | WO-2020013483 A1 * | 1/2020 | ........... G01N 1/2247 |
| WO | 2020/169877 A1 | 8/2020 | |

OTHER PUBLICATIONS

Dongho Shin et al., "Verification of dilution ratio of the newly developed ejector-porous tube diluter for measurement of fine dust in coal-fired power plant stack", Particle and Aerosol Reasearch, vol. 15, No. 3, Sep. 2019, pp. 105-113.

Chinese Office Action issued on Dec. 12, 2024, in connection with the Chinese Patent Application No. 202210861510.2 with its English translation, 21 pages.

* cited by examiner

APPARATUS FOR DILUTING EXHAUST GAS

CROSS-REFERENCE TO RELATED APPLICATION

This application claims priority to and the benefit of Korean Patent Application No. 10-2021-0094806 filed in the Korean Intellectual Property Office on Jul. 20, 2021, the entire contents of which are incorporated herein by reference.

TECHNICAL FIELD

The present invention relates to an apparatus for diluting exhaust gas, and more particularly, to an apparatus for diluting exhaust gas capable of increasing measurement accuracy even for a high-concentration exhaust gas by diluting the high-concentration exhaust gas to fit a measurement range of a particle counter in order to measure a concentration of particles included in the exhaust gas.

BACKGROUND ART

When a concentration of sampled particles exceeds a measurement range of a particle counter, a particle dilution device is a device that is installed in front of the particle counter to dilute the sampled particles at a constant dilution ratio and then transfer the diluted particles to the particle counter, thereby measuring even high-concentration sampling particles.

In order to increase measurement accuracy in an environment inside a chimney in a high temperature, high moisture, and high concentration environment, the dilution should be performed while minimizing the generation of droplet. In addition, it is necessary to increase the measurement accuracy by maximally suppressing the occurrence of particle loss according to the structure of the dilution apparatus.

In addition, in order to accurately measure the concentration of fine particles in an industrial discharge facility such as a chimney, it is very important to satisfy a constant velocity suction condition. This is because, when the constant velocity suction condition is not satisfied, sampling is performed more or less, and thus, the concentration of the measured particle is distorted, resulting in a difference from the actual concentration of particle inside the chimney.

In addition, a flow velocity of exhaust gas in the chimney of an industrial site variably changes according to the situation. The particle counter measures the concentration of particles of the diluted gas and converts the concentration of the particle to be measured based on the measured concentration of particles. When the dilution ratio changes as a flow rate of exhaust gas introduced into the dilution device variably changes according to the velocity of exhaust gas, errors may occur in the measurement value of the concentration of particles.

The related art has tried to satisfy the constant velocity suction condition by manually replacing a sampling nozzle or automatically adjusting a cross-sectional area of an inlet of the sampling nozzle by measuring the flow velocity inside the chimney. However, in the case of the manual method, it is difficult and cumbersome to respond immediately to the change in the flow velocity because the apparatus should be disassembled and reassembled to replace the nozzle whenever the flow rate conditions change. In the case of the method of automatically changing a size of an inlet nozzle by measuring a change in flow velocity, when the change in the flow velocity is faster than a reaction speed of a driving unit of the apparatus that changes the size of the inlet nozzle, there is a disadvantage in that the constant velocity suction error occurs and the particle loss is likely to increase depending on the shape of the knob that controls the cross-sectional area.

In addition, in order to accurately measure the concentration of particles, a constant flow rate should always be able to be sucked regardless of a change in pressure inside the chimney. This is because, when the sampled flow rate changes as the amount of exhaust gas introduced into the apparatus for diluting exhaust gas changes when the pressure inside the chimney changes, the dilution ratio changes, and thus, the measurement accuracy of the concentration of particles decreases.

Therefore, in order to accurately sample particles in the chimney under the high-temperature, high-humidity and high-concentration conditions, the constant velocity suction should be possible while maintaining the constant dilution ratio according to the change in pressure and flow velocity inside the chimney, and complex conditions such as no condensation of moisture should be satisfied.

DISCLOSURE

Technical Problem

The present invention has been made in an effort to provide an apparatus for diluting exhaust gas having advantages of accurately measuring a concentration of particles by minimizing a particle loss while satisfying a condition of sucking a constant flow rate at a constant velocity regardless of an environment in which a pressure and flow velocity inside a chimney change.

Problems to be solved by the present disclosure are not limited to the above-mentioned aspects. That is, other aspects that are not described may be obviously understood by those skilled in the art from the following specification.

Technical Solution

An exemplary embodiment of the present invention provides an apparatus for diluting exhaust gas, including: a stagnant air forming unit configured to form stagnant air by decelerating a flow velocity of introduced exhaust gas; an ejector unit connected to a front end of the stagnant air forming unit, provided with an exhaust gas suction passage, which is a passage through which stagnant air is introduced from the stagnant air forming unit and the exhaust gas flows, and a dilution air supply passage, which is a passage through which the introduced primary dilution air is branched and supplied to a plurality of points of the exhaust gas suction passage, and introducing the exhaust gas through the exhaust gas suction passage and discharging the exhaust gas toward a front by a difference in pressure according to the supply of the primary dilution air; and a dilution unit coupled to a front end of the ejector unit and supplying secondary dilution air to primary dilution gas discharged by mixing the exhaust gas and primary dilution air to generate secondary dilution gas.

The stagnant air forming unit may include a diffuser unit provided with an introduction hole into which the exhaust gas is introduced, and having a gradually increasing radius along a direction in which the exhaust gas flows.

The stagnant air forming unit may further include: an air retention part in which the exhaust gas decelerated through the diffuser is retained and an outlet hole for discharging the exhaust gas along the flow direction is formed; and a sampling outlet part extending in a direction perpendicular to the air retention part to discharge the exhaust gas toward the ejector unit.

The dilution air supply passage may include: a main passage through which the primary dilution air is introduced from the outside; a first branch passage branched from the main passage to supply the primary dilution air to a rear end portion of the exhaust gas suction passage; and a second branch passage branched from the main passage and supplying the primary dilution air to a front end portion of the exhaust gas suction passage.

An end portion of the first branch passage may be formed to surround the rear end portion of the exhaust gas suction passage to discharge the primary dilution air toward a front of the rear end portion of the exhaust gas suction passage, and the end portion of the second branch passage may be formed to surround the front end portion of the exhaust gas suction passage to discharge the primary dilution air toward a front of the front end portion of the exhaust gas suction passage.

The exhaust gas suction passage may include a first suction unit that is formed in a rear end portion of the ejector unit and has a tube diameter gradually decreasing toward a front, a first accelerator that is formed at a front end of the first suction unit and has a constant tube diameter, a second suction unit that is formed at a front end of the first accelerator, produces a 1-1st dilution gas by mixing the primary dilution air introduced through the first branch passage and the exhaust gas, and has a tube diameter gradually decreasing, a second accelerator that is formed at the front end of the second suction unit and has a constant tube diameter, and a diffuser that is formed at a front end of the second accelerator, produces a 1-2nd dilution gas by mixing the primary dilution air introduced through the second branch passage and the 1-1st dilution gas, and has a gradually increasing tube diameter.

The apparatus may further include: a preheating unit formed between the stagnant air forming unit and the ejector unit to preheat the exhaust gas.

Advantageous Effects

According to an apparatus for diluting exhaust gas according to an exemplary embodiment of the present invention as described above, a stagnant air forming unit for introducing exhaust gas at a constant speed by decelerating a flow velocity of the exhaust gas is formed at a rear end portion, and thus, in a situation where the flow velocity of exhaust gas is variable, constant velocity suction is possible, thereby improving measurement accuracy.

In addition, by using a two-stage ejector, it is possible to maintain a constant dilution ratio by sucking a certain amount of exhaust gas even when a pressure of an inlet of an ejector unit changes, thereby increasing the measurement accuracy of particles.

In addition, since secondary dilution air is introduced in a center direction of a first flow passage part through a through hole formed in the first flow passage part, the number of particles of exhaust gas adhering to an inner circumferential surface of the first flow passage part may be reduced.

In addition, when the secondary dilution air is introduced into the first passage part through the through hole, the particles of exhaust gas adhering to the inner circumference surface of the first passage part may come off. Accordingly, it is possible to effectively improve the occurrence of particle loss in the process in which the exhaust gas becomes the secondary dilution gas.

In addition, since the exhaust gas is primarily diluted in the ejector unit and secondarily diluted in the dilution unit, the dilution rate may be increased.

Meanwhile, the exhaust gas is preheated in a preheating unit, mixed with high-temperature primary dilution air, and then, diluted at high temperature, and then mixed with room-temperature secondary dilution air, and thus, is diluted at room temperature to prevent the moisture in the exhaust gas from becoming droplets, thereby improving the measurement accuracy of the particles.

In addition, by providing a cleaning fluid supplier between the ejector unit and the preheating unit, and allowing the cleaning fluid to be simultaneously supplied in the ejector direction and the preheating unit direction, it is possible to effectively wash the inside of the apparatus for diluting exhaust gas. In particular, the cleaning fluid supplier is relatively connected to the rear end of the apparatus for diluting exhaust gas, so the distance between the supplied cleaning fluid and the measuring unit may be sufficiently secured, thereby preventing the problem in that the cleaning fluid is introduced into the measuring unit and the measuring unit is prevented from being distorted.

MODE FOR INVENTION

Detailed contents of other exemplary embodiments are described in a detailed description and are illustrated in the accompanying drawings.

Various advantages and features of the present invention and methods accomplishing them will become apparent from the following description of exemplary embodiments with reference to the accompanying drawings.

However, the present disclosure is not limited to exemplary embodiments to be described below, but may be implemented in various different forms, these exemplary embodiments will be provided only in order to make the present disclosure complete and allow those skilled in the art to completely recognize the scope of the present disclosure, and the present disclosure will be defined by the scope of the claims. Throughout the specification, like reference numerals denote like elements.

Hereinafter, an apparatus for diluting exhaust gas according to exemplary embodiments of the present disclosure will be described with reference to the accompanying drawings.

Figure 1:
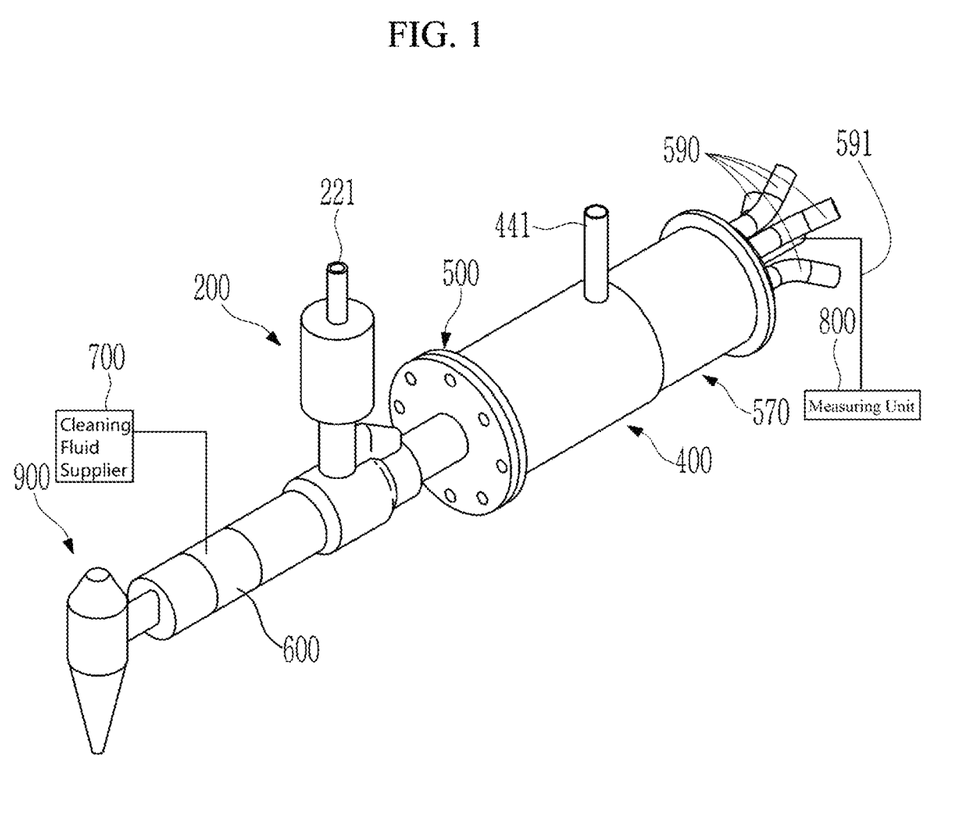
FIG. 1 is a perspective view illustrating an apparatus for diluting exhaust gas according to an exemplary embodiment of the present invention.
Figure 2:
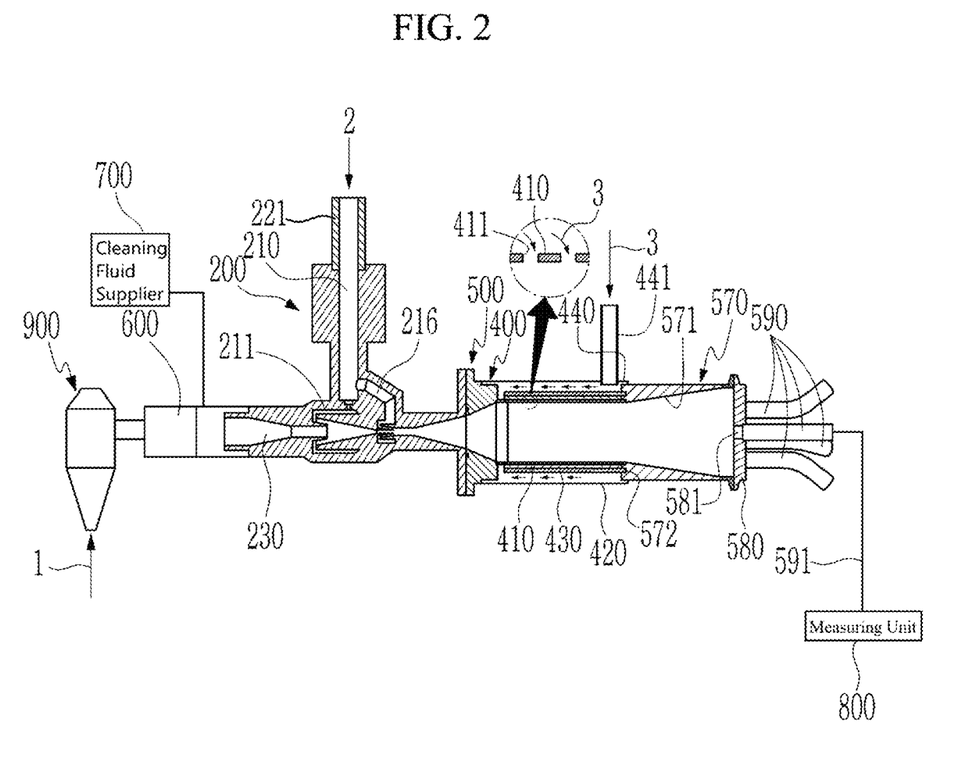
FIG. 2 is a cross-sectional view of the apparatus for diluting exhaust gas according to the exemplary embodiment of the present invention.
Figure 3:
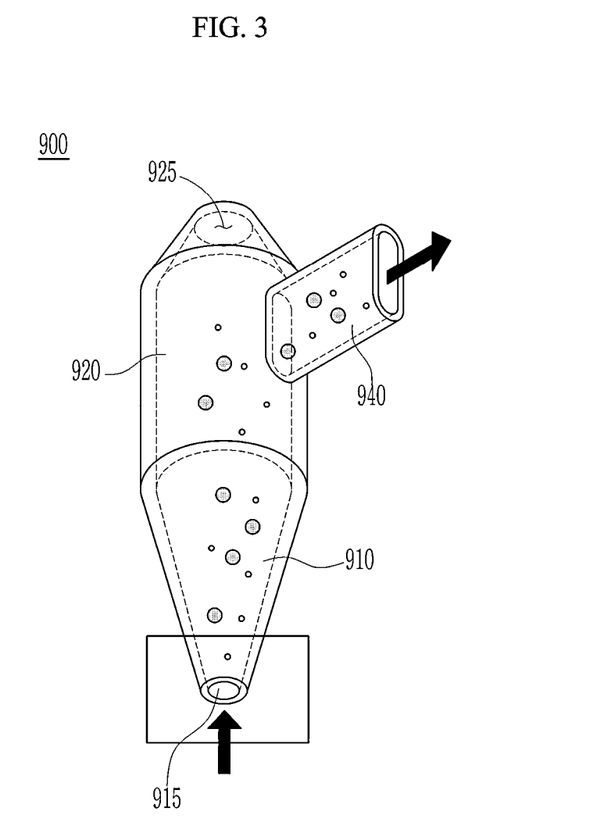
FIG. 3 is a perspective view of a stagnant air forming unit of FIG. 2.
Figure 4:
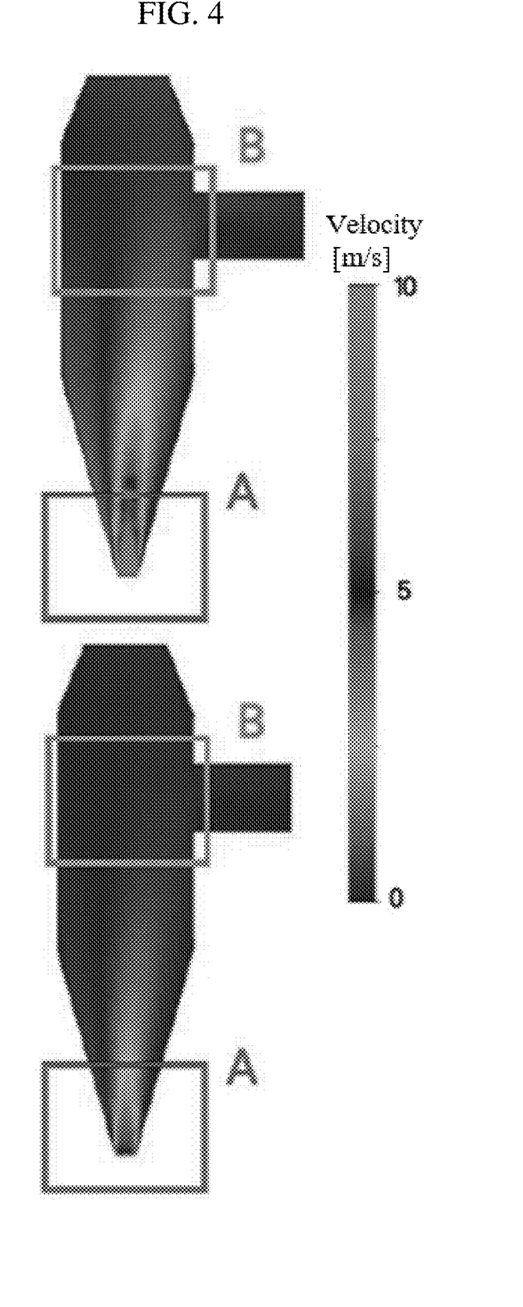
FIG. 4 is a diagram illustrating experimental results of deceleration results according to a velocity of exhaust gas introduced into the stagnant air forming unit.
Figure 5:
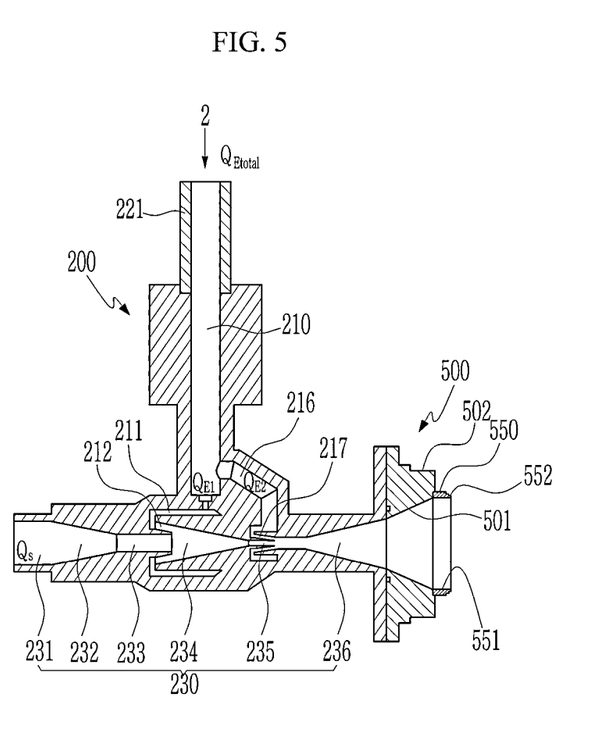
FIG. 5 is an enlarged cross-sectional view illustrating an ejector unit and an adapter part of FIG. 2.
Figure 6:
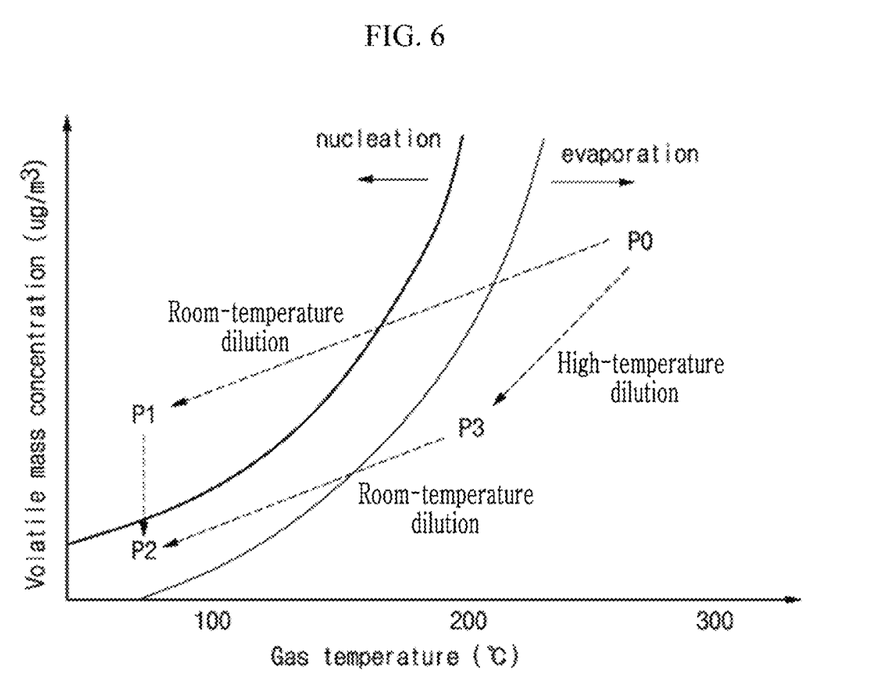
FIG. 6 is a graph for describing an effect according to dilution temperature in the apparatus for diluting exhaust gas according to an exemplary embodiment of the present invention.
Figure 7:
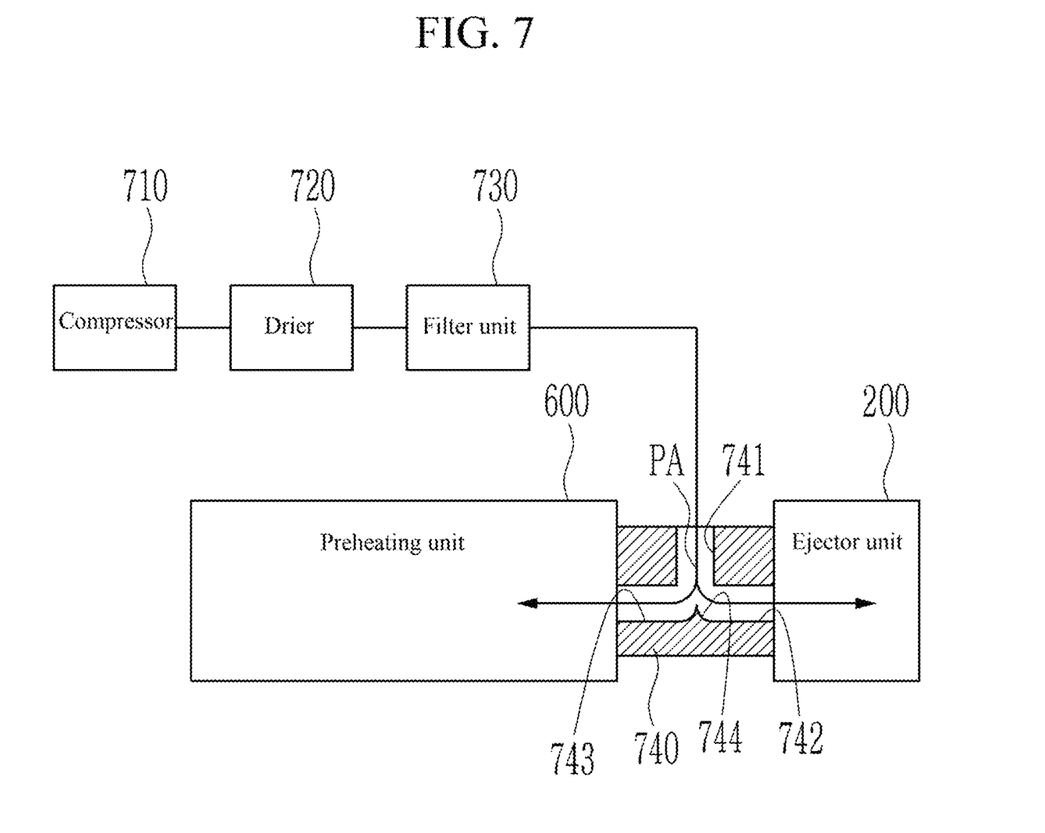
FIG. 7 is an exemplary view illustrating a cleaning fluid supplier of FIG. 1.
Figure 8:
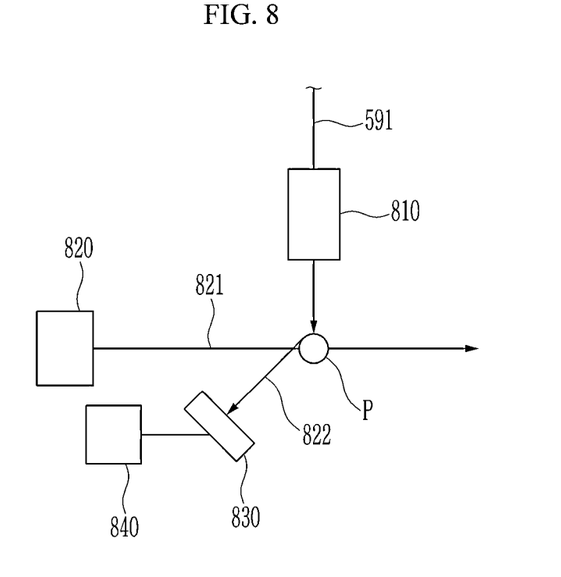
FIG. 8 is a configuration diagram illustrating a measuring unit of FIG. 1.

FIG. 1 is a perspective view illustrating an apparatus for diluting exhaust gas according to an exemplary embodiment of the present invention, FIG. 2 is a cross-sectional view of the apparatus for diluting exhaust gas according to the exemplary embodiment of the present invention, FIG. 3 is a perspective view of a stagnant air forming unit of FIG. 2, FIG. 4 is a diagram illustrating experimental results of deceleration results according to a velocity of exhaust gas introduced into the stagnant air forming unit, FIG. 5 is an enlarged cross-sectional view illustrating an ejector unit and an adapter part of FIG. 2, FIG. 6 is a graph for describing an effect according to dilution temperature in the apparatus for diluting exhaust gas according to an exemplary embodiment of the present invention, FIG. 7 is an exemplary view illustrating a cleaning fluid supplier of FIG. 1, and FIG. 8 is a configuration diagram illustrating a measuring unit of FIG. 1.

The apparatus for diluting exhaust gas according to an exemplary embodiment of the present invention may be configured to include a stagnant air forming unit 900, an ejector unit 200 and a diluting unit 400. In addition, the apparatus for diluting exhaust gas may further include a cleaning fluid supplier 700 and a preheating unit 600.

In the following description, for convenience of explanation, a front end/front end portion/front and rear end/rear end portion/rear are described based on a flow direction of the exhaust gas. That is, when the exhaust gas moves from a first point to a second point, the first point will be described as the rear end/rear end portion/rear, and the second point will be described as the front end/front end portion/front.

The stagnant air forming unit 900 may be connected to a rear end portion of the ejector unit 200, and more specifically, may be formed in the rear end portion of the preheating unit 600.

The stagnant air forming unit 900 forms stagnant air by decelerating exhaust gas 1 introduced at various flow velocities of several tens to hundreds of m/s to a velocity of several m/s or less. The velocity of the exhaust gas 1 introduced into the apparatus for diluting exhaust gas is not constant and may change. In particular, a flow velocity of exhaust gas in a chimney of an industrial site may variably change according to the situation. The sampled flow rate may change depending on the velocity of the exhaust gas 1 introduced into the apparatus for diluting exhaust gas. In order to keep the dilution ratio constant, it may be considered to control the amount of diluting air to be input differently, but it is not easy to immediately supply the amount of dilution air corresponding to the velocity. In particular, when the dilution air is supplied by being divided into primary dilution air 2 and secondary dilution air 3 by a multi-stage method as in the present invention, it may not be easier to control the amount of dilution air supplied to keep the dilution ratio constant.

Accordingly, according to the present invention, the diluting ratio may be kept constant by keeping the amount of diluting air constant and also keeping the velocity (flow rate) of exhaust gas supplied to the apparatus for diluting exhaust gas constant.

The stagnant air forming unit 900 may form stagnant air by rapidly decelerating the velocity even if the velocity of air introduced changes, and thus, may supply a certain amount of air to the ejector unit 200 to be supplied regardless of the velocity of air introduced into the stagnant air forming unit 900.

As illustrated in FIG. 3, the stagnant air forming unit 900 may be configured to include a diffuser unit 910, an air retention part 920 and a sampling outlet part 940.

The diffuser unit 910 has an introduction hole 915 through which the exhaust gas is introduced, and the radius of the passage may be formed to gradually increase along a direction in which the exhaust gas flows from the introduction hole 915. Accordingly, the exhaust gas introduced through the introduction hole 915 has a remarkably reduced flow velocity along with a decrease in pressure and depending on the length of the diffuser unit 910 or the slope of the passage, the magnitude of the deceleration through the diffuser unit 910 may be controlled differently.

The air retention part 920 is formed at the front end of the diffuser unit 910 and is a space in which the exhaust gas decelerated by the diffuser unit 910 is retained. An outlet hole 925 is formed in the front end surface of the air retention part 920, and thus, the exhaust gas which is decelerated and retained inside the air retention part 920 may be discharged along the flow direction. The air retention part 920 may be provided with a sampling outlet part 940 extending in a direction orthogonal to a flow direction.

The sampling outlet part 940 may be vertically formed on one side of the air retention part 920. As described above, the air decelerated by the diffuser unit 910 and retained in the air retention part 920 is discharged through the outlet hole 925, and a portion of the exhaust gas retained in the air retention part 920 may be discharged at a constant velocity through the sampling outlet part 940 extending vertically to the air retention part 920.

Therefore, in the present invention, it is possible to supply a certain amount of exhaust gas to the inside of the apparatus for diluting exhaust gas regardless of the velocity of exhaust gas introduced by the stagnant air forming unit 900, and thus, it is possible to sample particles while maintaining a constant dilution ratio under various flow velocity conditions.

FIG. 4 illustrates the experimental results of the velocity of the fluid discharged through the sampling outlet part 940 when fluids having different velocities are supplied to the stagnant air forming unit 900 through the inlet hole 915, according to the present invention, and it can be confirmed that the velocity of the fluid is reduced regardless of the velocity of the fluid introduced through the inlet hole 915, and thus, the fluid is discharged at a constant velocity through the sampling outlet 940.

In the present invention, the exhaust gas may be an example of a measurement target, and the measurement target is not necessarily limited to the exhaust gas. For example, when the measurement target is smoke from a chimney, a passage through which a part of the smoke is absorbed may be provided in the chimney, and the smoke moving through the passage may be supplied to the stagnant air forming unit 900.

The ejector unit 200 receives exhaust gas through the sampling outlet part 940 of the stagnant air forming unit 900 and supplies the exhaust gas to the dilution part 400 of the front end.

In the ejector unit 200, an exhaust gas suction passage 230, which is a passage through which exhaust gas is sucked and flows, may be formed to penetrate through in a central axis direction. In addition, dilution air supply passages 210, 211, and 216 may be formed so that the primary dilution air 2 for inducing constant velocity suction of exhaust gas is supplied onto the exhaust gas suction passage 230.

As illustrated in FIG. 5, the exhaust gas suction passage 230 may be formed by being divided into a space part 231, a first suction unit 232, a first accelerator 233, a second suction unit 234, a second accelerator 235, and a diffuser 236 from the rear to the front.

The space part 231 is an introductory part where a pipe diameter is uniformly formed and exhaust gas is introduced, and a rear end of the space part 231 may be provided with a cover (not illustrated) sealing the space part 231, and the exhaust gas may be introduced into the space part 231 through the cover.

The first suction unit 232 may be formed at the front end of the space part 231 and may be formed such that the inner diameter becomes smaller toward the front.

The first accelerator 233 may be formed at the front end of the first suction unit 232, connected to the first suction unit 232, and may be formed to have a constant inner diameter. The end portion 212 of the first branch passage to be described later may be formed to surround the first accelerator 233, and the primary dilution air may be discharged forward toward the second suction unit 234 of the front end of the first accelerator 233. As the primary dilution air 2 passes through the end portion 212 of the first branch passage having a small cross-sectional area, the flow velocity increases, and when the primary dilution air 2 is discharged to the second suction unit 234, the pressure of the discharge port of the first accelerator 233 decreases. Then, a pressure difference is generated between the second suction unit 234 and the space part 231, and the exhaust gas of the space part 231 may pass through the first suction unit 232 and the first accelerator 233 and may be sucked into the second suction unit 234. Accordingly, in the second suction unit 234, the primary dilution air 2 branched through the first branch passage 211 and the exhaust gas 1 are mixed to generate 1-1st dilution gas.

The second suction unit 234 may be formed at the front end of the first accelerator 233 and may be formed such that the inner diameter becomes smaller toward the front. As described above, at the rear end of the second suction unit 234, the primary dilution air 2 may be introduced through the first branch passage 211, and the exhaust gas of the space part 231 may be sucked into the second suction unit 234 due to the pressure difference caused by the introduced primary dilution air 2 and may be mixed with the primary dilution air.

The second accelerator 235 may be formed at the front end of the second suction unit 234, connected to the second suction unit 234 and formed to have a constant inner diameter. The end portion 217 of the second branch passage to be described later may be formed to surround the second accelerator 235, and the primary dilution air may be discharged forward toward the diffuser 236 of the front end of the second accelerator 235. As the primary dilution air 2 passes through the end portion 217 of the second branch passage having a small cross-sectional area, the flow velocity increases, and when the primary dilution air 2 is discharged to the front of the second suction unit 235, the pressure decreases. Then, the pressure difference is generated between the front of the second accelerator 235 and the second suction unit 234, and the 1-1st dilution gas of the second suction unit 234 passes through the second accelerator 235 and moves to the diffuser 236 of the front of the second accelerator 235. Accordingly, in the diffuser 236, the 1-1st dilution gas and the branched and supplied primary dilution air 2 are mixed to produce 1-2nd dilution gas.

As described above, the dilution air supply passages 210, 211, and 216 may be formed in the ejector unit 200. The dilution air supply passages 210, 211, and 216 are generally formed to penetrate through the radial direction and branch and supply the primary dilution air 2 on the exhaust gas suction passage 230.

A first pipe 221 guiding the introduction of the primary dilution air 2 from the outside may be coupled to the dilution air supply passages 210, 211, and 216.

In the present invention, the dilution air supply passage may be configured to include a main passage 210, a first branch passage 211, and a second branch passage 216. The main passage 210 is coupled to the first pipe 221 to introduce the primary dilution air 2 from the outside.

The first branch passage 211 and the second branch passage 216 are branched from the main passage 210 and supplies the primary dilution air 2 to the exhaust gas suction passage 230. The end portion 212 of the branched first branch passage may be formed to surround the first accelerator 233 to jet the primary dilution air 2 branched toward the second suction unit 234 of the front end of the first accelerator 233. In addition, the end portion 217 of the branched second branch passage may be formed to surround the second accelerator 235 to jet the primary dilution air 2 branched toward the diffuser 236 of the front end of the second accelerator 235.

As described above, in the present invention, the primary dilution air 2 is branched into two stages within the ejector unit 200 and discharged onto the exhaust gas suction passage 230 to suck the exhaust gas located at the rear of the ejector unit 200.

In this exemplary embodiment, a description will be given of a form branched into two stages, but it is not necessarily limited thereto and may be formed by being branched into multiple stages.

In this case, as illustrated in FIG. 5, when a pressure of a $Q_s$ portion at the rear end of the ejector unit 200 increases, the flow rate of $Q_{E1}$ branched with respect to $Q_{Etotal}$ through which a constant flow rate is introduced through the main passage 210 decreases and the flow rate of $Q_{E2}$ relatively increases.

Conversely, when the pressure of the $Q_s$ portion at the rear end of the ejector unit 200 is reduced, the flow rate of $Q_{E1}$ branching with respect to $Q_{Etotal}$ that a constant flow rate is introduced through the main passage 210 increases, and the flow rate of $Q_{E2}$ relatively decreases.

In this way, even if the exhaust gas pressure at the rear end of the ejector unit 200 is different, the flow rate of the primary dilution air 2 introduced into the exhaust gas introduction passage 230 through the first branch passage 211 and the second branch passage 216 that are branched is different (the total amount of the primary dilution air 2 is the same), the flow rate of the sucked $Q_s$ may be kept constant. Therefore, in the present invention, even if the exhaust gas pressure of the rear end of the ejector unit 200 is different, since the amount of $Q_s$ sucked is constant, the dilution ratio may be kept constant.

The primary dilution air 2 may be high-temperature air, and may be supplied at a temperature of 150° C. to 250° C.

The apparatus for diluting exhaust gas according to an exemplary embodiment of the present invention may further include a first adapter part 500 and a second adapter part 550.

The first adapter part 500 may be coupled to a front end of the ejector unit 200.

As illustrated in FIG. 5, an extension diffuser 501 may be formed to penetrate through the first adapter part 500 in the axial direction. The extension diffuser 501 may be formed to have an inner diameter increasing toward the front direction and may be formed to be continuous with the diffuser 236 of the ejector unit 200.

The first adapter part 500 may be provided with a second step groove 502 formed along an outer circumferential surface of a front end portion.

The second adapter part 550 may be coupled to a front end of the first adapter part 500.

The second adapter part 550 may be provided with a passage hole 551 formed to penetrate through in the axial direction, and the passage hole 551 may be connected to the extension diffuser 501 of the first adapter part 500.

The primary dilution air 2 introduced into the ejector unit 200 through the dilution air supply passages 210, 211, and 216 and the exhaust gas 1 sucked through the exhaust gas suction passage 230 are mixed to produce the primary dilution gas, and the produced primary dilution gas may move through the extension diffuser 501 and the passage hole 551.

The second adapter part 550 may be provided with a third step groove 552 formed along the outer circumferential surface of the front end portion.

The dilution unit 400 may include a first passage part 410 into which the primary dilution gas is introduced through the first adapter part 500 and the second adapter part 550 and a second passage part 420 for guiding the supplied secondary dilution air 3 to the first passage part 410 to be mixed with the primary dilution gas. In the dilution unit 400, the primary dilution gas and the secondary dilution air 3 may be mixed to produce the secondary dilution gas.

Specifically, the dilution unit 400 may be coupled to the front end of the first adapter part 500 and the second adapter part 550. A rear end portion of the first passage part 410 may be coupled to the third step groove 552 of the second adapter part 550. The first passage part 410 may be formed to be continuous with the passage hole 551 of the second adapter part 550, and the primary dilution gas generated by being mixed in the diffuser 236 may move to the first passage part 410.

A plurality of through holes 411 may be formed through the first passage part 410.

The second passage part 420 may be formed to surround the first passage part 410 by a predetermined distance from the outside of the first passage part 410. A rear end portion of the second passage part 420 may be coupled to the second step groove 502 of the first adapter part 500.

A second inlet 440 through which the secondary dilution air 3 is introduced may be formed in the front end portion of the outer circumferential surface of the second passage part 420. A second pipe 441 for guiding the secondary dilution air 3 from the outside may be connected to the second inlet 440.

In addition, the dilution part 400 may be provided with a guide wall 430. The guide wall 430 may be provided between the first passage part 410 and the second passage part 420. In addition, the rear end portion of the guide wall 430 may be spaced apart from the front end portion of the first adapter part 500. As a result, most of the space between the first passage part 410 and the second passage part 420 may be partitioned by the guide wall 430, and the flow length of the secondary dilution air 3 introduced through the second inlet 440 may be long. That is, the secondary dilution air 3 introduced through the second inlet 440 may move in the rear direction in the space between the second passage part 420 and the guide wall 430 and may move to the space between the first passage part 410 and the guide wall 430 through the space between the guide wall 430 and the first adapter part 500. Then, the secondary dilution air 3 moves to the inside of the first passage part 410 through the through hole 411 formed in the first passage part 410 and is mixed with the primary dilution gas to produce the secondary dilution gas.

Since the plurality of through holes 411 are formed in the first passage part 410 as a whole, the outer circumferential surface area of the first passage part 410 decreases. Accordingly, the number of particles that adheres to the inner circumferential surface of the first passage part 410 among the exhaust gas particles of the primary dilution gas may decrease, so the exhaust gas particle loss may decrease.

Furthermore, when the secondary dilution air 3 is introduced into the central direction of the first passage part 410 through the through hole 411, it is possible to hinder the flow of particles toward the inner circumferential surface of the first passage part 410 and cause the exhaust gas particles adhering to the inner circumferential surface of the first passage part 410 to come off.

Accordingly, most of the particles in the exhaust gas moved in the first passage part 410 may be mixed with the secondary dilution air 3, and the loss of particles while the exhaust gas turns into the secondary dilution gas may also be effectively reduced.

The apparatus for diluting exhaust gas according to the exemplary embodiment of the present invention may include a diffusion tube part 570, a stopper 580, and an exhaust pipe 590.

The diffusion tube part 570 may be coupled to the front end of the dilution part 400.

A rear end portion of the diffusion tube part 570 may be provided with a coupling groove 572 along the circumferential direction, so that the front end portion of the guide wall 430 is inserted and coupled thereto. In addition, the rear end portion of the diffusion tube part 570 may be inserted and coupled to the inside of the second passage part 420.

The diffusion tube part 570 may be provided with an additional diffuser 571 that is formed to penetrate through in the axial direction. The additional diffuser 571 may be formed to have an inner diameter increasing toward the front, and the secondary dilution gas generated in the dilution unit 400 may move to the additional diffuser 571.

The stopper 580 may be coupled to the front end portion of the diffusion tube part 570 to seal the front end portion of the diffusion tube part 570.

A plurality of discharge pipes 590 may be coupled to the stopper 580. A connection hole 581 may be formed to penetrate through the stopper 580 so that the stopper 580 is coupled to the discharge pipe 590, and the secondary dilution gas of the additional diffuser 571 may be moved to the discharge pipe 590 through the connection hole 581. A particle counter (not illustrated) may be connected to at least one of the discharge pipes 590, and the secondary dilution gas may move to the particle counter through the discharge pipe 590.

According to this exemplary embodiment, the introduced exhaust gas 1 is mixed with the primary dilution air 2 in the ejector unit 200 to be primarily diluted and is mixed with the secondary dilution air 3 in the dilution unit 400 to be secondarily diluted, so the dilution rate may increase.

As described above, the primary dilution air 2 supplied to the ejector unit 200 may be a high temperature air of 150° C. to 250° C. Therefore, the primary dilution gas generated through the ejector unit 200 may be generated by a high-temperature dilution method. The secondary dilution air 3 supplied to the dilution unit 400 may be room-temperature air, and may be supplied at a temperature of 10° C. to 30° C. Accordingly, the secondary dilution gas generated by the dilution unit 400 may be generated by a dilution method at room temperature.

FIG. 6 is a graph for describing an effect according to dilution temperature in the apparatus for diluting exhaust gas according to an exemplary embodiment of the present invention.

Referring to FIG. 6, the exhaust gas introduced into the ejector unit 200 is in a high temperature state (P0). When the primary dilution air mixed with the exhaust gas in the high temperature state is room-temperature air, that is, when the high-temperature exhaust gas is diluted at room temperature, all moisture in the exhaust gas may be converted into droplets. Accordingly, the primary dilution gas in the first state P1 generated by the diffuser 236 may contain a large amount of droplets. When the primary dilution gas containing a large amount of droplets is mixed with the room-temperature secondary dilution air in the dilution unit 400 to produce the secondary dilution gas in the second state (P2), a large amount of droplets is continuously contained in the secondary dilution gas. Since these droplets may be treated as particles during measurement in the particle counter (not illustrated), it may cause a decrease in measurement accuracy.

However, according to the present invention, the primary dilution gas generated in the diffuser 236 may be in a third state P3 by mixing the exhaust gas in the high temperature state (P0) with the high-temperature primary dilution air 2, that is, by diluting the high-temperature exhaust gas at a high temperature, and moisture in the exhaust gas may be prevented from becoming droplets. In addition, since the primary dilution gas is mixed with the room-temperature secondary dilution air 3 in the dilution unit 400 to form the secondary dilution gas in the second state P2, the secondary dilution gas does not contain droplets or may contain a minimal amount of droplets, so the measurement accuracy of the particles may be improved.

The preheating unit 600 may be provided in the rear end portion of the ejector unit 200 and may pre-heat the exhaust gas 1 introduced into the ejector unit 200. The preheating unit 600 may preheat the exhaust gas 1 to a temperature of 190° C. to 210° C. When the exhaust gas 1 is preheated and moved to the ejector unit 200, it can be mixed with the above-mentioned primary dilution air 2 to be more effectively diluted at a high temperature.

As illustrated in FIG. 7, the cleaning fluid supplier 700 may include a compressor 710, a drier 720, a filter unit 730, and a joint passage part 740.

The compressor 710 may compress and inject a cleaning fluid PA. The room-temperature air may be used as the cleaning fluid PA but is not necessarily limited thereto.

The drier 720 may be provided at the front end of the compressor 710 and may dry the cleaning fluid PA.

The filter unit 730 may be provided at the front end of the drier 720 and may remove foreign substances contained in the cleaning fluid PA.

Accordingly, the cleaning fluid PA discharged from the filter unit 730 may be in a state not to contain moisture and foreign substances.

The joint passage part 740 may be provided between the ejector unit 200 and the preheating unit 600. The joint passage part 740 may guide a portion of the cleaning fluid PA moving through the filter unit 730 to the ejector unit 200 and guide the rest of the cleaning fluid PA to the preheating unit 600. To this end, the joint passage part 740 may include an introduction passage 741 extending in the radial direction of the joint passage part 740 and connected to the filter part 730 to introduce the cleaning fluid PA moving from the filter part 730, a first guide passage 742 connected to the introduction passage 741 and extending in the direction of the ejector unit 200, and a second guide passage 743 connected to the introduction passage 741 and extending in the direction of the preheating part 600. The first guide passage 742 and the second guide passage 743 may be formed to be symmetrical to each other with respect to the introduction passage 741 and may be formed to have the same diameter. The cleaning fluid PA introduced into the introduction passage 741 may be supplied to the first guide passage 742 and the second guide passage 743, respectively, at the same flow rate. The joint passage part 740 may be provided with a splitting protrusion 744 so that the cleaning fluid PA introduced into the introduction passage 741 may be bisected and supplied to the first guide passage 742 and the second guide passage 743, respectively, at the same flow rate. The splitting protrusion 744 is formed to protrude in the center so as to face the introduction passage 741 at the point where it is bisected into the first guide passage 742 and the second guide passage 743, thereby bisecting the introduction passage 741.

The cleaning fluid PA moving to the first guide passage 742 cleans the inside of each part while moving through the ejector unit 200, the dilution part 400, the diffusion tube part 570, and the discharge pipe 590.

In addition, the cleaning fluid PA moving to the second guide passage 743 may clean the inside of the preheating unit 600 while moving through the preheating unit 600.

As illustrated in FIGS. 1, 2 and 8, the apparatus for diluting exhaust gas may include a measuring unit 800 that is coupled to the front end of the diluting unit 400, and measures particle information of the secondary diluting gas.

The measuring unit 800 may be configured to include an injector 810, a light source 820, a light receiving unit 830, and a calculator 840.

The secondary dilution gas may move to the injector 810 through a flow passage 591 connected to the discharge pipe 590. Then, the injector 810 may sequentially inject particles P included in the secondary dilution gas one by one.

The light source 820 may irradiate the light 821 in a direction crossing the injection path of the particles P injected from the injector 810. When the light 821 crossing the injection path of the particle P collides with the particle P on the injection path, scattering may occur.

The light receiving unit 830 is provided on one side of the injection path and may receive the light 822 scattered by the particles P injected from the injector 810 after being irradiated from the light source 820. When the size of the particles P injected from the injector 810 is large, the scattered light 822 may increase, and conversely, when the size of the particles P is small, the scattered light 822 may decrease.

The calculator 840 may calculate size information of particles included in the secondary dilution gas based on the light information generated by the light receiving unit 830. The particle size information may be calculated for particles acquired during a preset measurement time. The size information of particles may be calculated for particles acquired during a preset measurement time.

The size information of particles calculated by the calculator 840 may be calculated as, for example, the concentration of PM10 (Particulate Matter with a diameter less than 10 μm), which is usually referred to as fine dust with a particle size of 10 μm or less, or the concentration of PM2.5, which is usually referred to as ultra fine dust with a particle size of 2.5 μm or less.

The measuring unit 800 is not limited to the above-described configuration and may be formed in other known configurations for measuring the concentration of particles.

The closer the cleaning fluid supplier 700 is to the front end of the apparatus for diluting exhaust gas, the closer the distance between the supplied cleaning fluid and the measuring unit 800 is. Then, foreign substances inside the apparatus for diluting exhaust gas move to the measuring unit 800 by the cleaning fluid, and disturbance of the measuring unit 800 may occur, so the measurement accuracy may decrease. However, in the present invention, the cleaning fluid supplier 700 is connected to the relatively rear part of the apparatus for diluting exhaust gas, so that the distance between the supplied cleaning fluid and the measuring unit 800 may be sufficiently secured, thereby preventing the above-mentioned problems from occurring.

The scope of the present invention is not limited to the abovementioned exemplary embodiment but may be implemented in various forms that fall within the claims. The present invention may be variously modified by those skilled in the art to which the present invention pertains without departing from the scope of the present invention as defined by the claims. In addition, these modifications are to fall within the scope of the appended claims.

<Description of symbols>

| | |
|---|---|
| 1: Exhaust gas | 2: Primary dilution air |
| 3: Secondary dilution air | 200: Ejector unit |
| 210: Main passage | 211: First branch passage |
| 212: End portion of first branch passage | |
| 216: Second branch passage | |
| 217: End portion of second branch passage | 221: First pipe |
| 230: Exhaust gas suction passage | 231: Space part |
| 232: First suction unit | 233: First accelerator |
| 234: Second suction unit | 235: Second accelerator |
| 236: Diffuser | 400: Dilution unit |
| 410: First passage part | 411: Through hole |
| 420: Second passage part | 430: Guide wall |
| 440: Second inlet | 441: Second pipe |
| 500: First adapter part | 501: Extension diffuser |
| 502: Second step groove | 550: Second adapter part |
| 551: Passage hole | 552: Third step groove |
| 570: Diffusion tube part | 571: Additional diffuser |
| 572: Coupling groove | 580: Stopper |
| 581: Connection hole | 590: Discharge pipe |
| 591: Flow passage | 600: Preheating unit |
| 700: Cleaning fluid supplier | 710: Compressor |
| 720: Drier | 730: Filter unit |
| 740: Joint passage part | 741: Introduction passage |
| 742: First guide passage | 743: Second guide passage |
| 744: Splitting protrusion | 800: Measuring unit |
| 810: Injector | 820: Light source |
| 830: Light receiving unit | 840: Calculator |
| 900: Stagnant air forming unit | 910: Diffuser unit |
| 915: Introduction hole | 920: Air retention part |
| 925: Outlet hole | 940: Sampling outlet part |

The invention claimed is:

1. An apparatus for diluting exhaust gas, the apparatus comprising:
   a stagnant air forming unit configured to form stagnant air by decelerating a flow velocity of introduced exhaust gas;
   an ejector unit connected to a front end of the stagnant air forming unit, provided with
      an exhaust gas suction passage, which is a passage through which the stagnant air is introduced from the stagnant air forming unit and the exhaust gas flows, and
      a dilution air supply passage, which is a passage through which introduced primary dilution air is branched and supplied to a plurality of points of the exhaust gas suction passage, and introducing the exhaust gas through the exhaust gas suction passage and discharging the exhaust gas toward a front by a difference in pressure according to a supply of the primary dilution air; and
   a dilution unit coupled to a front end of the ejector unit and supplying secondary dilution air to primary dilution gas discharged by mixing the exhaust gas and primary dilution air to generate secondary dilution gas.

2. The apparatus of claim 1, wherein:
the stagnant air forming unit includes:
   a diffuser unit provided with an introduction hole into which the exhaust gas is introduced, and having a gradually increasing radius along a direction in which the exhaust gas flows.

3. The apparatus of claim 2, wherein:
the stagnant air forming unit further includes:
   an air retention part in which the exhaust gas decelerated through the diffuser unit is retained and an outlet hole for discharging the exhaust gas along the flow direction is formed; and
   a sampling outlet part extending in a direction perpendicular to the air retention part to discharge the exhaust gas toward the ejector unit.

4. The apparatus of claim 1, wherein:
the dilution air supply passage includes:
   a main passage through which the primary dilution air is introduced from an outside;
   a first branch passage branched from the main passage to supply the primary dilution air to a rear end portion of the exhaust gas suction passage; and
   a second branch passage branched from the main passage and supplying the primary dilution air to a front end portion of the exhaust gas suction passage.

5. The apparatus of claim 4, wherein:
an end portion of the first branch passage is formed to surround the rear end portion of the exhaust gas suction passage to discharge the primary dilution air toward a front of the rear end portion of the exhaust gas suction passage, and
an end portion of the second branch passage is formed to surround the front end portion of the exhaust gas suction passage to discharge the primary dilution air toward a front of the front end portion of the exhaust gas suction passage.

6. The apparatus of claim 4, wherein:
the exhaust gas suction passage includes
   a first suction unit that is formed in a rear end portion of the ejector unit and has a tube diameter gradually decreasing toward a front,
   a first accelerator that is formed at a front end of the first suction unit and has a constant tube diameter,
   a second suction unit that is formed at a front end of the first accelerator, produces a 1-1st dilution gas by mixing the primary dilution air introduced through the first branch passage and the exhaust gas, and has a tube diameter gradually decreasing,
   a second accelerator that is formed at a front end of the second suction unit and has a constant tube diameter, and
   a diffuser that is formed at a front end of the second accelerator, produces a 1-2nd dilution gas by mixing the primary dilution air introduced through the second branch passage and the 1-1st dilution gas, and has a gradually increasing tube diameter.

7. The apparatus of claim 1, further comprising:
a preheating unit between the stagnant air forming unit and the ejector unit to preheat the exhaust gas.

8. The apparatus of claim 1, the stagnant air forming unit includes:
- a diffuser unit having an introduction hole into which the exhaust gas is introduced in a first flow direction, and the diffuser unit having a gradually increasing radius along the first flow direction in which the exhaust gas flows;
- an air retention part configured to retain the exhaust gas decelerated through the diffuser unit and including an outlet hole configured to discharge the exhaust gas along the first flow direction; and
- a sampling outlet part extending in a direction perpendicular to the air retention part to discharge the exhaust gas toward the ejector unit in a second flow direction, the second flow direction being perpendicular to the first flow direction.

* * * * *